United States Patent [19]

Kimura

[11] Patent Number: 4,812,090
[45] Date of Patent: Mar. 14, 1989

[54] METHOD OF AND APPARATUS FOR ADJUSTING THE WEIGHT OF A WORKPIECE

[75] Inventor: Nobuo Kimura, Hiroshima, Japan

[73] Assignee: Mazda Motor Corporation, Hiroshima, Japan

[21] Appl. No.: 7,197

[22] Filed: Jan. 27, 1987

[30] Foreign Application Priority Data

Jan. 28, 1986 [JP] Japan ................ 61-17577
Mar. 17, 1986 [JP] Japan ................ 61-59044

[51] Int. Cl.4 ............................................ B23C 3/00
[52] U.S. Cl. ................................. 409/132; 408/1 R; 408/2; 409/133
[58] Field of Search ............... 409/133, 188, 195, 246, 409/131, 132; 408/1 R, 2; 51/2 AA, 165.75, 165.76, 326

[56] References Cited

U.S. PATENT DOCUMENTS

| | | | |
|---|---|---|---|
| 2,690,702 | 10/1954 | Romans et al. | 409/133 X |
| 3,004,666 | 10/1961 | Hack | 409/133 X |
| 3,529,510 | 9/1970 | Albright et al. | 408/2 X |
| 3,847,055 | 11/1974 | Hack | 409/195 |
| 3,891,835 | 6/1975 | Shoda et al. | 408/2 |

FOREIGN PATENT DOCUMENTS 2338867 2/1975 Fed. Rep. of Germany .......... 408/2
65660 4/1984 Japan.

Primary Examiner—Z. R. Bilinsky
Attorney, Agent, or Firm—Fleit, Jacobson, Cohn & Price

[57] ABSTRACT

The present invention relates to a method and apparatus for adjusting the weight of workpiece by twice machining a weight-adjustment portion formed on the workpiece. In the present invention, the same cutting tool is used for machining the weight-adjustment portion and the feeding position for the second machining of the weight-adjustment portion is determined in response to the weight of the workpiece after the first machining. According to the present invention, even if the tips of the cutting tool should wear because of prolonged machining operations and, as a result, the amount of the first machining is insufficient, the said insufficiency is compensated for by the second machining.

18 Claims, 7 Drawing Sheets

F I G. 2
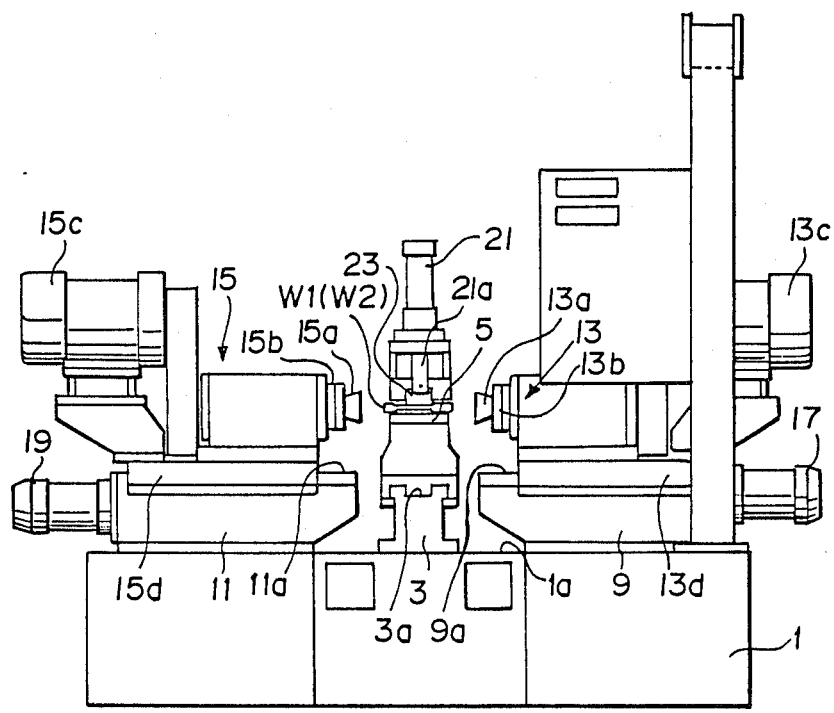

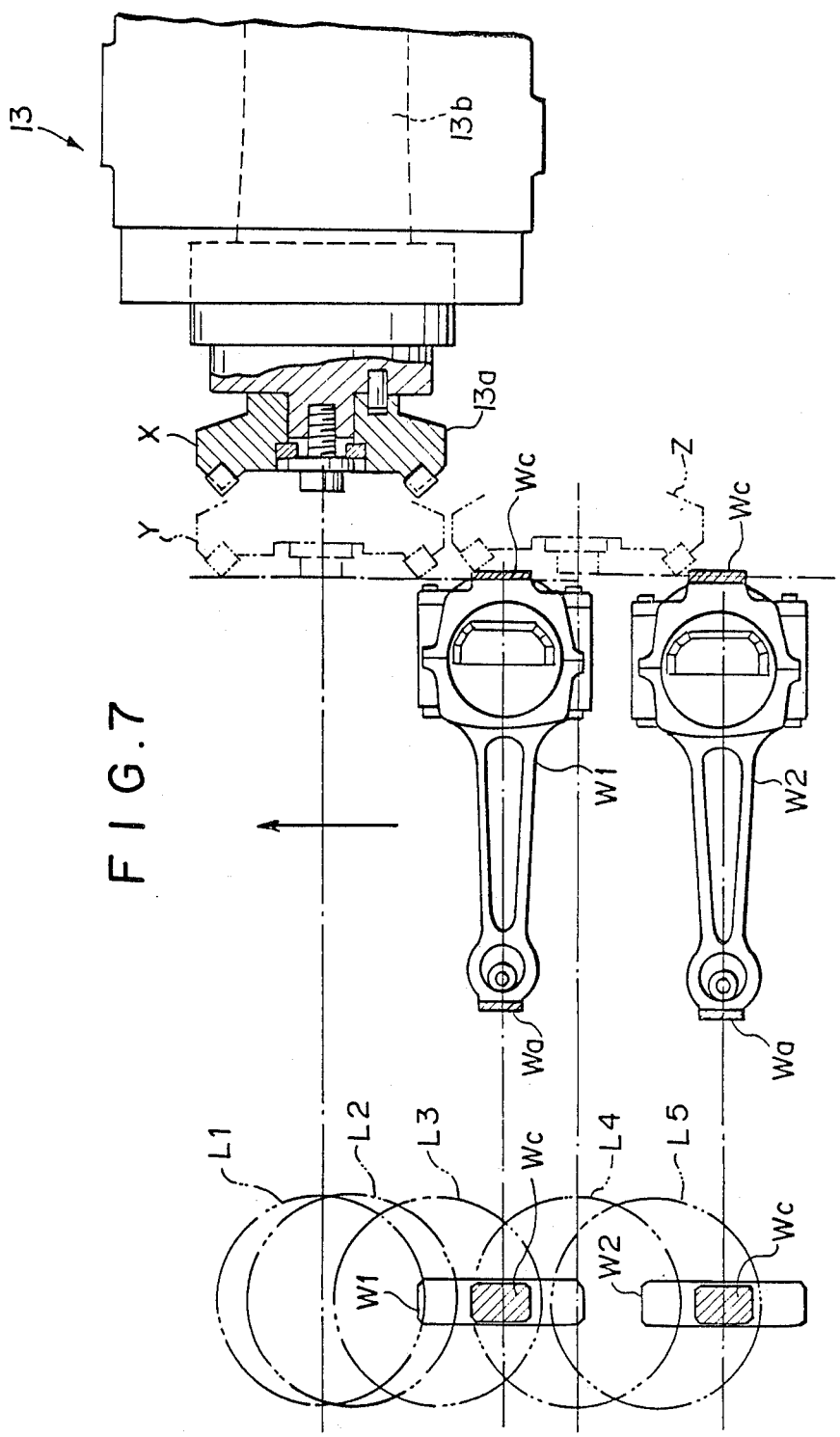

METHOD OF AND APPARATUS FOR ADJUSTING THE WEIGHT OF A WORKPIECE

BACKGROUND OF THE INVENTION

1. Field of the Invention

The present invention relates to a method of and an apparatus for adjusting the weight of a workpiece to a desired value by machining a weight-adjustment portion formed on the workpiece.

2. Description of the Prior Art

It has been desired to reduce the vibration of automobile engine during operation. For this, it is necessary to ensure that such moving parts as the pistons, connecting rods, and crankshaft are of accurately controlled weight so that the crankshaft can rotate in a well balanced condition. Above all, the connecting rods, which convert reciprocating movement of the piston into rotating movement of the crankshaft, have to be accurately adjusted in weight because they have a particularly large effect on whether the crankshaft rotates in a well balanced condition.

A known method of balancing rotating members is disclosed in Japanese Patent Public-Disclosure No. 59-65660 in which a ring gear for starting an engine is fixed around the body of a torque converter by MIG welding in such manner that the weight of each weld bead is adjusted so as to obtain balanced rotation of the ring gear. Such method can only be utilized when welding is used. Further the method is not useful where the differences in weight among workpiece is rather large, as in the case of casted connecting rods.

Thus, it might be considered that for a connecting rod, a useful method would be to form a portion for weight adjustment on both ends of the connecting rod and then to machine these portions with an appropriate cutting tool to such degree as required to match the weight of the connecting rod with a predetermined weight. In this case, since the difference in weight among casted connecting rods is large it is desirable to use two-stage machining process. In this process, the cutting tool is first positioned at a predetermined reference feeding position and driven to machine the weight-adjustment portion. After the first machining is finished the cutting tool is moved to a predetermined second feeding position and is driven again to machine the same portion. Thus by the first and the second machining the weight of the connecting rod is adjusted to the desired value. Further two cutting tools, one for each machining operation, are preferably used for the purpose of improving operational efficiency where large numbers of connecting rods are processed.

However, the bit of the cutting tool will wear over long-term operation and, therefore, the cutting amount gradually becomes less even if the cutting tool is positioned precisely. Thus, it is impossible to perform an accurate machining operation for obtaining a connecting rod with a desired weight. The same problem occurs when two cutting tool are used as mentioned above. In this case, the wear rates are different between the two cutting tool, so that it is even more difficult to obtain accurate machining.

SUMMARY OF THE INVENTION

It is therefore an object of the present invention to provide a method of adjusting the weight of a workpiece by machining a weight-adjustment portion formed on the workpiece, which method always performs the desired machining operation and adjusts the weight of the workpiece to a predetermined value even after the machining operation has been carried out for a prolonged period.

Another object of the present invention is to provide an apparatus for carrying out the method of the present invention as described above.

A further object of the present invention is to provide an apparatus for adjusting the weight of a workpiece which performs an accurate and efficient machining operation on a weight-adjustment portion formed on the workpiece.

To achieve the above objects, in the present invention, the same cutting tool is utilized for machining a weight-adjustment portion formed on a workpiece and the machining operation is carried out two times. The second machining is carried out with the cutting tool positioned at an adjusted feeding position which is determined in response to the weight of the workpiece after the first machining. According to the present invention, the cutting tool is first fed to a predetermined reference feeding position and is driven to machine the weight-adjustment portion. After the first machining is finished, the workpiece is weighed and an adjusted feeding position for the second machining is calculated according to the measured weight. Then the portion is subject to a second machining to thereby obtain a workpiece with a predetermined weight. According to the present invention, even if the bit of the cutting tool should wear because of prolonged machining operation and, as a result, the amount of machining by the first machining should be insufficient, the insufficiency of machining is compensated by the second machining the feeding position of which is determined in response to the weight of the workpiece. Thus, workpiece can always be adjusted to a predetermined weight.

In another aspect of the present invention, an apparatus is provided which includes cutting tool means for machining a weight-adjustment portion formed on a workpiece, work supporting means capable for supporting both a first workpiece whose weight-adjustment portion has been subjected to first machining and a second workpiece with no machining applied to its weight-adjustment portion means for positioning the cutting tool means to an adjusted feeding position for a second machining of the first workpiece and to a reference feeding position for the first machining of the second workpiece, means for feeding the cutting tool means positioned at the reference and the adjusted feeding positions with respect to the workpiece in the direction from the first workpiece to the second one, drive means for the cutting tool means which drives the cutting tool means to carry out the first and second machinings of the weight-adjustment portions of the first and second workpieces, means for determining said adjusted feeding position in response to the weight of the first workpiece, and means for controlling said positioning means, feeding means and drive means to carry out the second machining for the first workpiece and the first machining for the second workpiece in this order. The apparatus is preferably adapted for adjusting the weight of a connecting rod. In this case, the weight-adjustment portion is formed on each end thereof and corresponding two cutting tools are provided. It is also preferable that the apparatus is provided with measuring means for weighing the workpiece after the first machining.

In the apparatus, after the second machining is finished, the cutting tool is transferred from the adjusted feeding position to the reference feeding position. The weight-adjustment portion of the second workpiece projects beyond that of the first workpiece toward the cutting tool so that positioning of the cutting tool to the reference position can be carried out without considering if the tips of the cutting tool touches the weight-adjustment portion of the second workpiece. On the contrary, when the cutting tool is positioned to the adjusted position after the first machining is finished, the weight-adjustment portions of the first and second workpieces must be apart from each other to an extent that the tips of the cutting tool do not touch both of them simultaneously and the cutting tool must be fed back from the portion before positioning it to the adjusted feeding position. Hence, according to the present invention, the positioning of the cutting tool can be attained by transferred it by a short distance, which can be done in a short time.

Other objects and the advantages of the invention will be become apparent upon reading the following detailed description.

BRIEF DESCRIPTION OF THE DRAWINGS

FIG. 2 is a side view of the apparatus shown in FIG. 1;

FIG. 7 shows the relationships between the tips of a cutting tool and the weight-adjustment portion on a workpiece during operation;

DESCRIPTION OF THE PREFERRED EMBODIMENT

While the invention will be described in connection with a preferred embodiment, it will be understood that we do not intend to limit the invention to this embodiment. On the contrary, we intend to cover all alternatives, modifications, and equivalents as may be included within the spirit and scope of the invention as defined by the attached claims.

Figure 1:
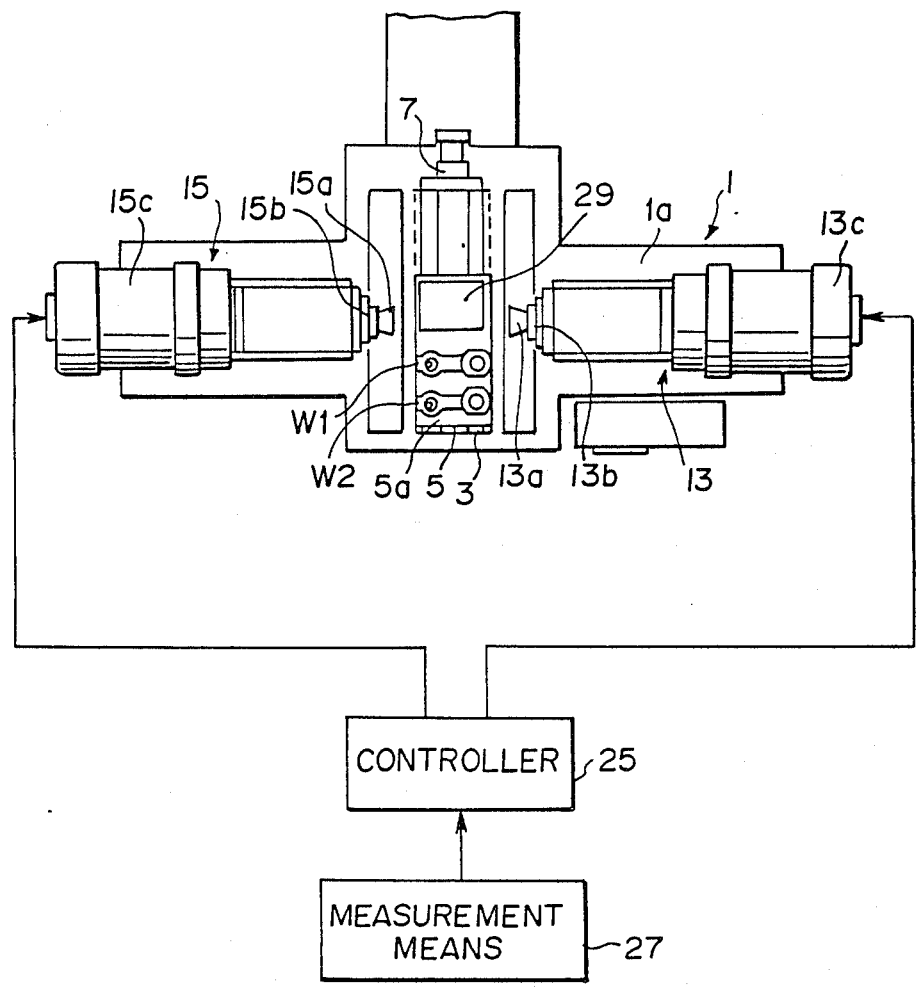
FIG. 1 is a top plan view of an apparatus in accordance with the present invention.
Figure 3:
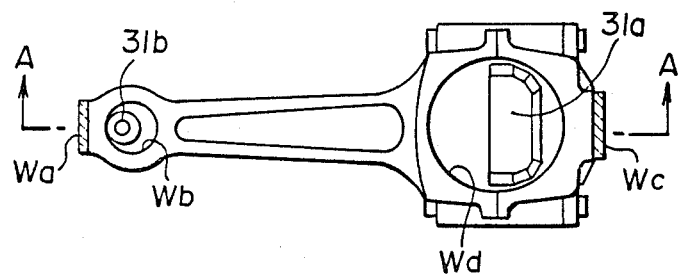
FIG. 3 shows a workpiece fixed on the apparatus with an attachment mechanism provided thereon.
Figure 4:
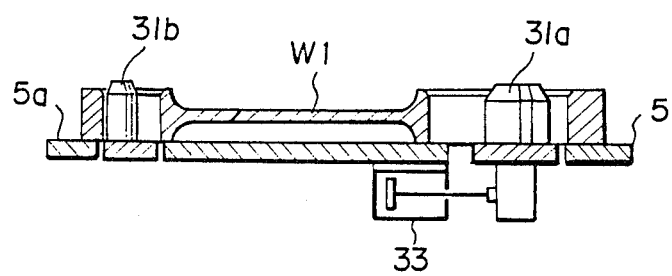
FIG. 4 is a sectional view taken along A—A in FIG. 3.

Now referring to the drawings, FIGS. 1 and 2 show a plan and a side view of a weight adjusting apparatus for a workpiece according to the invention. The apparatus shown is adapted for adjusting the weight of a connecting rod of a reciprocating engine as shown in FIGS. 3 and 4.

The apparatus as shown in FIGS. 1 and 2 has a bed 1, on the surface 1a of which there is provided a fixed table 3. The table 3 is located in the center of the surface 1a and extends transversely. On the top surface of the table 3 is formed a guide surface 3a for guiding a movable table 5 slidably supported thereon. The movable table 5 supports two workpieces, in this case first and second connecting rods W1 and W2, and is moved hydraulically by a drive portion 7 fixed on one side of the table 5. A pair of supports 9 and 11 for cylinder units 13 and 15 are also disposed on the surface 1a of the bed 1 on opposite sides of the table 5 so as to face each other. The supports 9 and 11 are formed with guide surfaces 9a and 11a on their top surfaces. Cylinder units 13 and 15 are slidably supported on the guide surfaces 9a and 11a. Motors 17 and 19 for driving the cylinder units are provided on the supports 9 and 11, respectively. The units 13 and 15 have main spindles 13b and 15b which support cutting tools 13a and 15a at the ends facing the table 5 and are connected to main spindle motors 13c and 15c at the other ends. The main spindles 13b and 15b can be rotated about their axes by the motors 13c and 15c. These main spindles 13b, 15b and motors 13c, 15c are supported on slides 13d and 15d which are slidable along guides 9a and 11a as shown in FIG. 2. A hydraulic cylinder 21 is disposed above the table 5 and the piston rod 21a thereof extends downwardly toward the table 5. The rod 21a has a clamp 23 at the end and extends downward to press the clamp 23 for fixing the workpieces W1 and W2. The movements of the above mentioned portions are controlled by a controller 25. The controller 25 calculates an adjusted feeding position of the cutting tool for a second machining in response to the weight of the workpiece after the first machining has been completed. Measuring means 27 is provided for weighing the workpiece and supplying information representing the weight to the controller 25

Now, referring also to FIGS. 3 and 4, the shape of the workpieces and an attachment mechanism for fixing a workpiece to the table will be explained. Each connecting rod (workpiece) is provided with a weight-adjustment portion Wa at the side of a piston pin bearing Wb and a weight-adjustment portion Wc at the other end of crankshaft bearing Wd. Two pairs of pins project upwardly from the surface of the table 5. The drawings show only one pair of pins 31a and 31b for fixing the first workpiece W1. The pins 31a and 31b are placed along the axis of the main spindle. The pin 31a disposed at the side of the unit 13 can be inserted into the crankshaft bearing Wd and can be moved along the axis of the main spindle by a hydraulic cylinder 33. The other pin 31b disposed at the side of the unit 15 can be inserted into the piston pin bearing Wb but is not movable. Thus, by driving the cylinders 21 and 33, the clamp 23 presses the workpiece W1 against the surface 5a of the table 5 and the pin 31a presses the bearing Wd thereof laterally.

Figure 5:
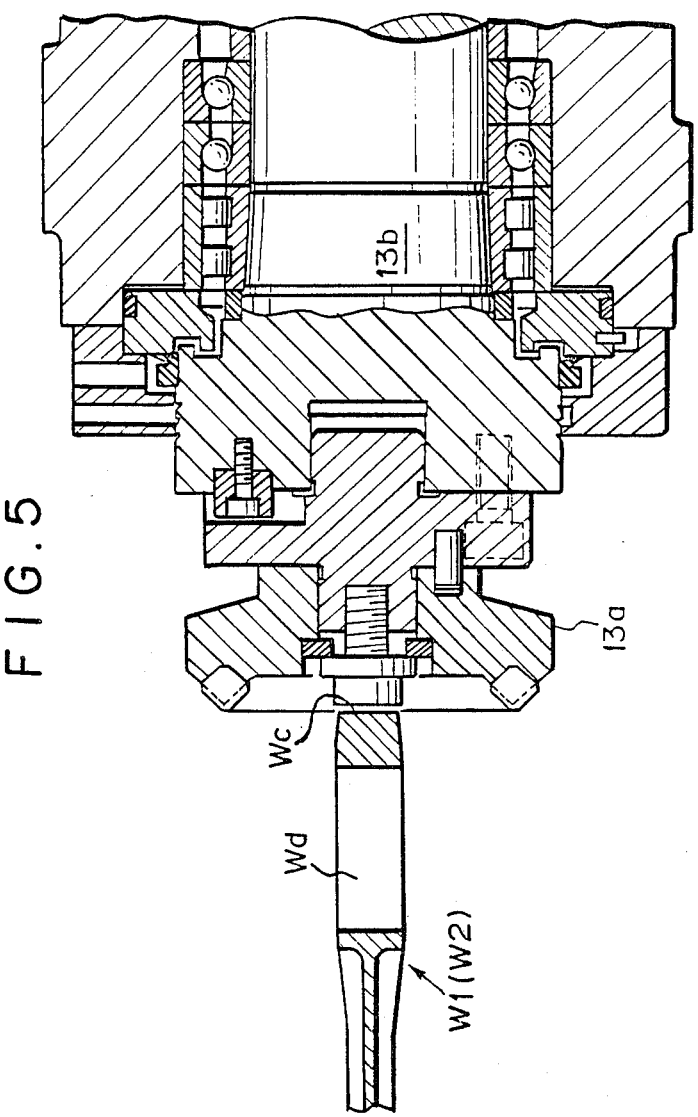
FIG. 5 is an enlarged sectional view of a cutting tool.

Next the cutting tools 13a and 15a will be explained with reference to FIG. 5. The cutting tool 13a is a face milling cutter and has a plurality of cutting tips arranged around. With the motor 13c being driven to rotate the cutting tool 13a, the table is slid forward so that the cutting tool moves with respect to the connecting rods on the table 5 as shown by the phantom lines in FIG. 7 to thereby machine the portions Wc on the connecting rods. The cutting tool 15a is the same as the cutting tool 13a.

Figure 6:
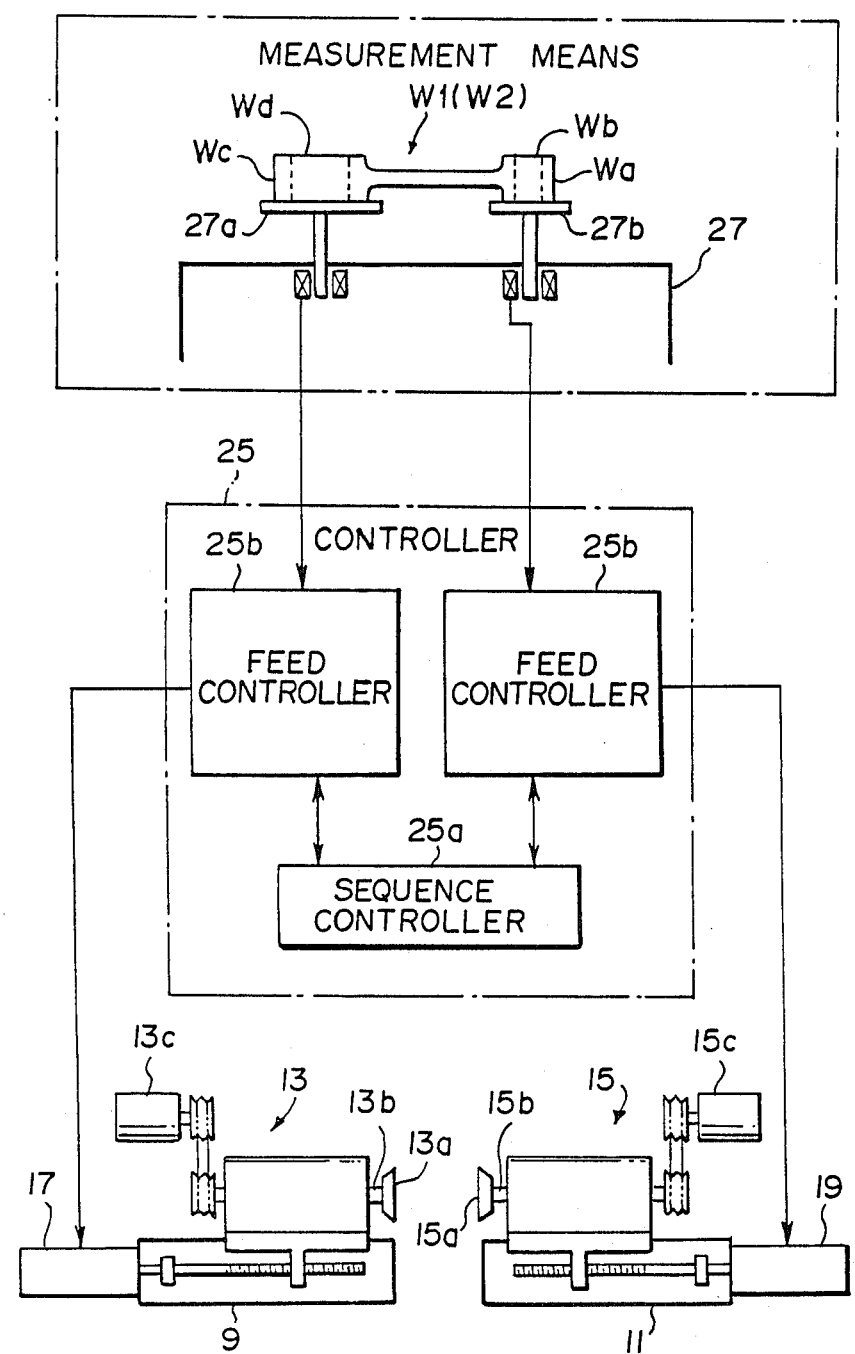
FIG. 6 is a block diagram showing a part of a controller of the apparatus in FIG. 1.

A measuring means 27 is provided which measures the weight of the connecting rod W1 after the first machining. As shown in FIG. 6, the measure means 27 is of a balance type which supports the crankshaft bearing and the piston pin bearing portions of the connecting rod on the scale pans 27a and 27b and measures the displacements of the scale pans. The displacements represent the total weight of the connecting rod and the distribution of the weight between the two portions. Electrical signals representing the displacements are sent to the controller 25.

The controller 25 includes a sequence controller 25a and a feed controller 25b. The sequence controller 25a controls the first and the second machining operations on the weight-adjustment portions of the connecting rods in a predetermined order. The controller 25a generates a predetermined reference feeding position for the first machining and a predetermined adjusted feeding position for the second machining and supplies said positions to the feed controller 25b. The controller 25b compensates the adjusted feeding position based on the signals supplied from the measuring means 27. The signals are supplied from the controllers 25b to the respective motors 17 and 19 to drive them so that the cutting tools 13a and 15a are positioned to the reference and adjusted feeding positions.

Figure 8A:
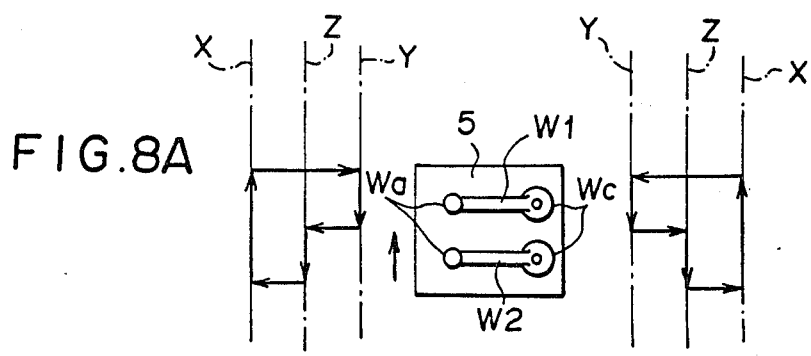
FIGS. 8A and 8B show the movement of the cutting tools of the apparatus with respect to the workpieces on the table.
Figure 8B:
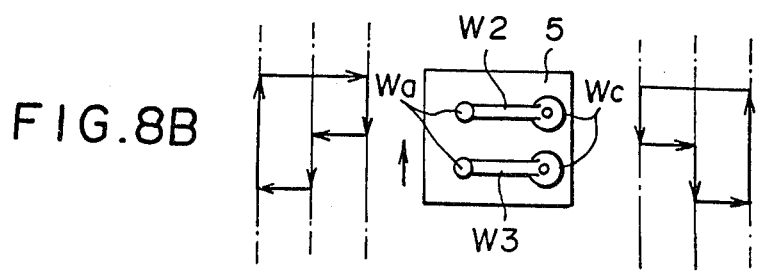

The cutting operation of the apparatus now will be explained with reference to FIGS. 8A and 8B.

(1) Firstly, the first and the second connecting rods W1 and W2 are disposed on the table 5 with the first connecting rod W1 being on the front side of the sliding direction of the table. After the connecting rods are clamped on the table, both cutting tools 13a and 15a are transferred from a primary position X to an adjusted feeding position Y which has been determined in a preceeding cycle as described hereinafter. The table 5 is moved forward and the cutting tools 13a and 15a positioned at the adjusted feeding position are then driven by the motors 13c and 15c to apply a second machining to the weight-adjustment portions Wc and Wa of the first connecting rod W1. The positions of the cutting tips where the cutting tools are first located, ths second machining is begun and finished are shown by the phantom lines L1, L2, and L3 in FIG. 7.

(2) After the second machining of the connecting rod W1, the table 5 is moved further forward to bring the first connecting rod W1 to the cutting point while both cutting tools 13a and 15a are returned to a predetermined reference feeding position Z. The cutting tools are then driven to apply a first machining to the weight-adjustment portions of the second connecting rod W2. The positions of the cutting tips where the first machining is begun and finished are show by the phantom lines L4 and L5 in FIG. 7.

(3) After the first cutting is finished, both cutting tools 13a and 15a are fed back again to the primary position X and the first connecting rod W1 which has been subjected to the first and second machining is removed from the table 5.

(4) Then the second connecting rod W2 is removed from the table 5 and transferred to the measuring means 27 by which the weight of the connecting rod is measured. Electric signals representing the weight are supplied to the feed controllers 25b which compensate the adjusted feeding positions Y for the second machining of the second connecting rod W2 in response to the supplied signals.

(5) The second connecting rod W2 is brought back to the table 5 and clamped thereto. This time the second connecting rod W2 is disposed where the first one W1 was located and another connecting rod W3 is disposed where the second connecting rod W2 was located as shown in FIG. 8B. After that the same cutting operation of steps (1), (2), (3) and (4) is carried out on the weight-adjustment portions of the connecting rods W2 and W3. However, in this operation, the cutting tools are transferred to the adjusted feeding position Y which was attained in response to the weight of the second connecting rod W2 and the second machining is applied to the second connecting rod W2. The above mentioned steps are repeated sequentially and, subjecting a large number of connecting rods to the first and second machinings.

The invention has thus been shown and described with reference to a specific embodiment adapted to adjust the weight of a connecting rod, however, it should be noted that the invention can be adapted for other kinds of workpieces as well as workpieces with one or more weight-adjustment portions.

I claim:

1. A method of adjusting the weight of a workpiece to a predetermined value by machining a weight-adjustment portion formed on the workpiece comprising the steps of positioning a feeding means for a cutting tool to a predetermined reference feeding position and driving the cutting tool carried on said feeding means to machine said weight-adjustment portion, weighing the workpiece after the machining, obtaining an adjusted feeding position in response to the measured weight of the workpiece, said adjusted feeding position being a distance from said reference feeding position; and then positioning said feeding means to the adjusted feeding position and driving the cutting tool, which is carried on said feeding means and has been used for said machining, to machine said weight-adjustment portion again.

2. The method in accordance with claim 1 wherein the machining of said weight-adjustment portion at said adjusted feeding position for one workpiece and the machining of the weight-adjustment portion at said reference feeding position for another workpiece are sequentially carried out.

3. The method in accordance with claim 1 wherein said workpiece is a connecting rod with piston pin bearing and crankshaft bearing portions on its ends, and said adjusted feeding position is determined by measuring the distribution of the weight between said bearing portions.

4. The method in accordance with claim 2 wherein said workpiece is a connecting rod with piston pin bearing and crankshaft bearing portions on its ends, and said adjusted feeding position is determined by measuring the distribution of the weight between said bearing portions.

5. An apparatus for adjusting the weight of a workpiece by machining a weight-adjustment portion formed on the workpiece comprising cutting tool means for machining the weight-adjustment portion, work supporting means capable of supporting both a first workpiece whose weight-adjustment portion has been subjected to a first machining and a second workpiece the weight-adjustment portion thereof not having been machined, means for positioning the cutting tool means to an adjusted feeding position for a second machining of the first workpiece and to a reference feeding position for a first machining of the second workpiece, means for feeding the cutting tool means positioned at the reference and the adjusted feeding positions with respect to the workpieces in the direction from the first workpiece to the second one, drive means for the cutting tool means which drives the cutting tool means to carry out the first and second machinings of the weight-adjustment portions of the first and the second workpieces, means for determining said adjusted feeding position in response to the weight of the first workpiece, and means for controlling said positioning means, feeding means and drive means to carry out the second machining of the first workpiece and the first machining of the second workpiece in this order.

6. The apparatus in accordance with claim 5 wherein said positioning means includes feeding means for said cutting tool which transfers the-cutting tool toward said work supporting means and positions it to said adjusted position.

7. The apparatus in accordance with claim 5 wherein said workpieces are a connecting rod with piston pin and crankshaft bearing portions, and said work supporting means includes a pair of positioning means, each having two pins insertable into said piston pin and crankshaft bearing, respectively, and at least one of said pins is movable along the axis of said connecting rod.

8. The apparatus in accordance with claim 6 wherein said workpieces are a connecting rod with piston pin and crankshaft bearing portions, and said work supporting means includes a pair of positioning means, each having two pins insertable into said piston pin and crankshaft bearing, respectively, and at least one of said pins is movable along the axis of said connecting rod.

9. The apparatus in accordance with claim 7 wherein said weight-adjustment portion is formed on at least one of said piston pin and crankshaft bearing portions and said cutting tool means are arranged on the side of said weight-adjustment portion with respect to the connecting rods.

10. The apparatus in accordance with claim 8 wherein said weight-adjustment portion is formed on at least one of said piston pin and crankshaft bearing portions and said cutting tool means are arranged on the side of said weight-adjustment portion with respect to the connecting rods.

11. The apparatus in accordance with claim 7 wherein said weight-adjustment portion is formed on both ends of said piston pin and crankshaft bearing portions, and two of said cutting tool means are provided, one for each weight-adjustment portion.

12. The apparatus in accordance with claim 8 wherein said weight-adjustment portion is formed on boths end of said piston pin and crankshaft bearing portions, and two of said cutting tool means are provided, one for each weight-adjustment portion.

13. The apparatus in accordance with claim 7 which further includes measurement means that supports said piston pin and crankshaft bearing portions of the connecting rod and measures the distribution of the weight between said two bearing portions.

14. The apparatus in accordance with claim 8 which further includes measurement means that supports said piston pin and crankshaft bearing portions of the connecting rod and measures the distribution of the weight between said two bearing portions.

15. The apparatus in accordance with claim 9 which further includes measurement means that supports said piston pin and crankshaft bearing portions of the connecting rod and measures the distribution of the weight between said two bearing portions.

16. The apparatus in accordance with claim 10 which further includes measurement means that supports said piston pin and crankshaft bearing portions of the connecting rod and measures the distribution of the weight between said two bearing portions.

17. The apparatus in accordance with claim 11 which further includes measurement means that supports said piston pin and crankshaft bearing portions of the connecting rod and measures the distribution of the weight between said two bearing portions.

18. The apparatus in accordance with claim 12 which further includes measurement means that supports said piston pin and crankshaft bearing portions of the connecting rod and measures the distribution of the weight between said two bearing portions.

* * * * *